(12) United States Patent
Terpsma

(10) Patent No.: US 9,016,708 B2
(45) Date of Patent: Apr. 28, 2015

(54) FIFTH WHEEL HITCH KINGPIN ASSEMBLY

(71) Applicant: SAF-Holland, Inc., Holland, MI (US)

(72) Inventor: Eric Terpsma, Holland, MI (US)

(73) Assignee: SAF-Holland, Inc., Holland, MI (US)

( * ) Notice: Subject to any disclaimer, the term of this patent is extended or adjusted under 35 U.S.C. 154(b) by 0 days.

(21) Appl. No.: 14/159,140

(22) Filed: Jan. 20, 2014

(65) Prior Publication Data

US 2014/0339790 A1 Nov. 20, 2014

Related U.S. Application Data

(63) Continuation-in-part of application No. 13/893,971, filed on May 14, 2013.

(51) Int. Cl.
*B62D 53/06* (2006.01)
*B60D 1/01* (2006.01)

(52) U.S. Cl.
CPC ..................................... *B60D 1/015* (2013.01)

(58) Field of Classification Search
USPC ........................................ 280/433, 434, 407.1
See application file for complete search history.

(56) References Cited

U.S. PATENT DOCUMENTS

| | | | |
|---|---|---|---|
| 2,838,324 A | 6/1958 | Dalton | |
| 2,907,582 A | 10/1959 | Bourke | |
| 2,958,541 A | 11/1960 | Bär | |
| 3,362,731 A * | 1/1968 | Gasche et al. | 285/212 |
| 3,520,557 A | 7/1970 | Kamman et al. | |
| 3,600,005 A | 8/1971 | Glaza | |
| 3,771,816 A * | 11/1973 | Hord, Jr. | 280/433 |
| 3,807,765 A | 4/1974 | Pokornicki | |
| 3,807,766 A | 4/1974 | Pleier et al. | |
| 3,811,708 A | 5/1974 | Baaso | |
| 3,887,251 A | 6/1975 | McKay | |
| 4,254,967 A | 3/1981 | Scanlon | |
| 5,411,281 A | 5/1995 | Poirier | |
| 6,073,952 A | 6/2000 | Schulz | |
| 6,220,617 B1 | 4/2001 | Hunger | |
| 6,322,093 B1 | 11/2001 | Athans et al. | |
| 6,565,109 B1 | 5/2003 | Kloepfer | |
| 6,773,023 B2 | 8/2004 | Athans et al. | |
| 6,877,757 B2 | 4/2005 | Hayworth | |
| 7,766,361 B2 | 8/2010 | Hungerink et al. | |
| 2001/0028160 A1 | 10/2001 | Athans et al. | |
| 2002/0190497 A1 | 12/2002 | Metternich | |

FOREIGN PATENT DOCUMENTS

| | | |
|---|---|---|
| GB | 810903 | 3/1959 |
| GB | 1395003 | 5/1975 |
| GB | 2128952 | 10/1982 |

* cited by examiner

*Primary Examiner* — Kevin Hurley
*Assistant Examiner* — Michael Stabley
(74) *Attorney, Agent, or Firm* — Price Heneveld LLP

(57) ABSTRACT

A kingpin assembly comprises a housing having a recess located therein, a kingpin having at least a portion located within the recess of the housing, a coupler member operably coupled to the kingpin, and a collet member engaging the housing and the kingpin, and engaging the coupler member such that an uncoupling of the coupler member from the kingpin at least partially disengages the collet member from the kingpin.

23 Claims, 4 Drawing Sheets

FIFTH WHEEL HITCH KINGPIN ASSEMBLY

BACKGROUND OF THE INVENTION

The present invention relates to a kingpin assembly for use within a fifth wheel hitch assembly, and particularly to a kingpin assembly that includes a locking collet to prevent rotation of the kingpin with respect to an associated housing, and a spanner nut that aids in disassembly of the collet from the kingpin assembly.

SUMMARY OF THE INVENTION

One aspect of the present invention is to provide a kingpin assembly that comprises a housing having a recess located therein, a kingpin having at least a portion located within the recess of the housing, a coupler member operably coupled to the kingpin, and a collet member engaging the housing of the kingpin, and engaging the collar member such that at least partially uncoupling the collar member from the kingpin at least partially disengages the collet member from the kingpin.

The present inventive kingpin assembly prevents rotation of the kingpin with respect to the associated housing while simultaneously allowing easy access to and replacement of an associated kingpin subsequent to wear thereof. Further, the kingpin assembly is adapted to allow easy disassembly of the kingpin assembly by at least partially disengaging a collet member of the assembly as a coupler member is at least partially uncoupled from an associated kingpin. The present inventive assembly is more durable, allows replacement of certain components thereof by even unskilled personnel, is extremely efficient in use, capable of a long operating life, and particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
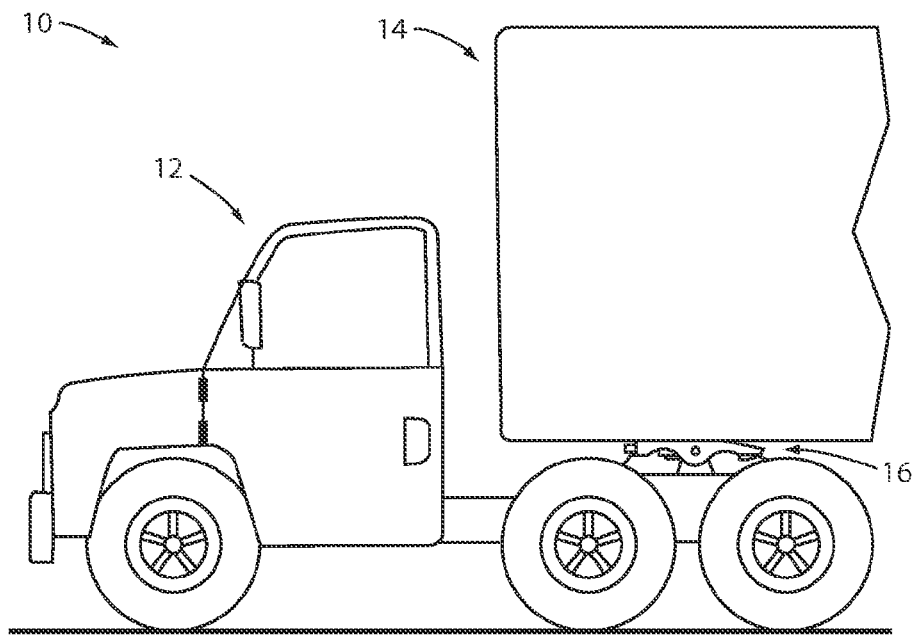
FIG. 1 is a side elevational view of a tractor and heavy duty trailer supported thereby.
Figure 3A:
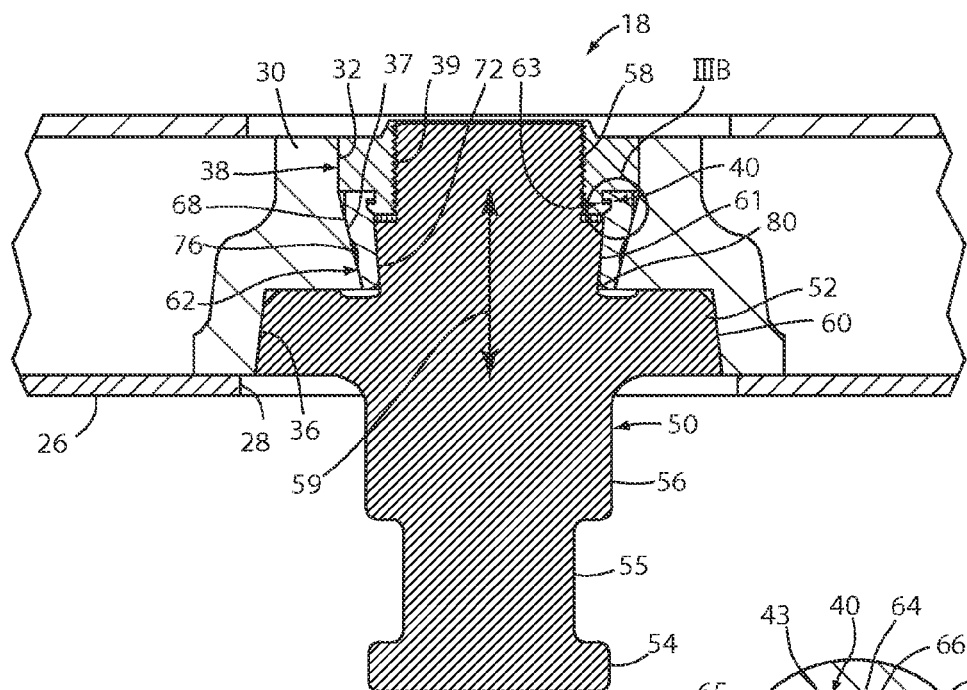
FIG. 3A is a cross-sectional side view of the kingpin assembly fully assembled, taken through the line III-III, FIG. 2.
Figure 3B:
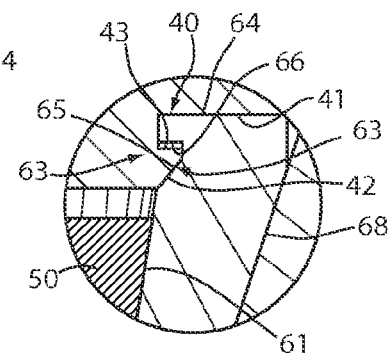
FIG. 3B is an enlarged view of the area IIIB of FIG. 3A.

For purposes of description herein, the terms "upper," "lower," "right," "left," "rear," "front," "vertical," "horizontal," and derivatives thereof shall relate to the invention as oriented in FIGS. 1 and 3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
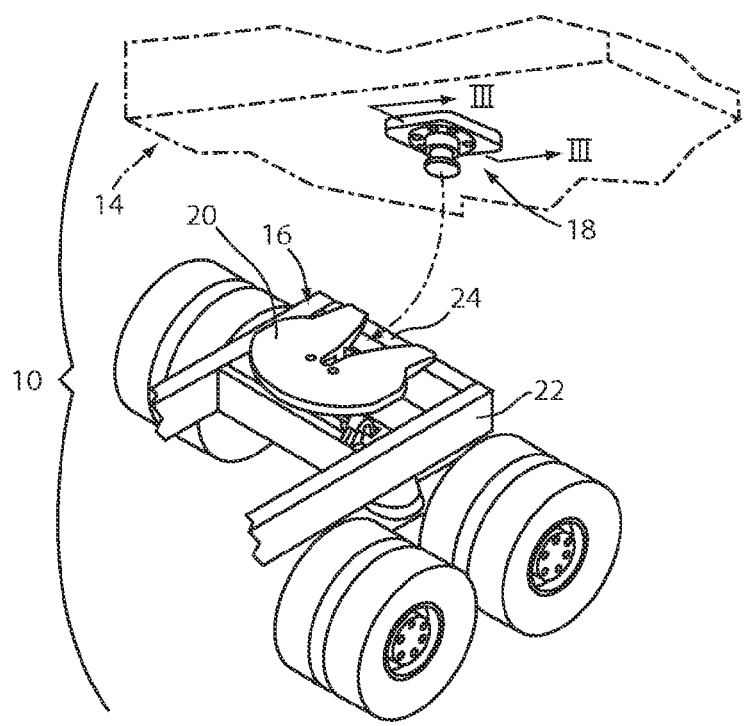
FIG. 2 is a perspective view of a fifth wheel hitch assembly and kingpin assembly of the present invention.

The reference numeral 10 (FIG. 1) generally designates a heavy duty tractor and trailer combination, wherein a tractor 12 operationally supports an associated trailer 14 via a fifth wheel hitch assembly 16 (FIG. 2) and a kingpin assembly 18 cooperating therewith and generally embodying the present invention. In the illustrated example, the fifth wheel hitch assembly 16 includes a fifth wheel hitch plate 20 pivotally coupled to a frame 22 of the associated tractor 12 and including a tapered kingpin-receiving throat 24 and a locking assembly (not shown) as well known in the art.

The kingpin assembly 18 (FIGS. 3A-4) is adapted for use within a trailer skid plate 26 mounted to an underside of the associated trailer 14. The trailer skid plate 26 includes an aperture 28 extending therethrough and that cooperates with the kingpin assembly 18 therein. The kingpin assembly 18 includes a housing 30 having a recess in the form of a centrally-located aperture 32 extending therethrough. The aperture 32 further includes a downwardly-opening, conically-shaped step wall 36, and an upwardly-opening, conically-shaped engagement wall 37.

The kingpin assembly 18 further includes a ring-shaped collar member or spanner nut 38 including a centrally-located threaded aperture 39 and a first portion of a coupler or a circumferentially extending keyway 40, a first abutment surface 41, a conically-shaped second abutment surface 42, and a third abutment surface 43.

The kingpin assembly 18 further comprises a kingpin 50 that includes an upper head portion 52, a lower head portion 54, a recessed lock-receiving portion 55 positioned between the upper head portion 52 and the lower head portion 54, a body portion 56, a threaded upper portion 58 that is threadably received within the aperture 39 of the collar member 38, such that threadably tightening and loosening the collar member 38 with the kingpin 50 couples and uncouples the collar member 38 with the kingpin 50, and secures the kingpin 50 with respect to the housing 30 in the vertical direction 59. The upper head portion 52 of the kingpin 50 includes a first conically-shaped abutment surface 60 that abuts the step wall 36 of the housing 30, and a second conically-shaped abutment surface 61 located between the upper head portion 52 and the threaded upper portion 58.

Figure 4:
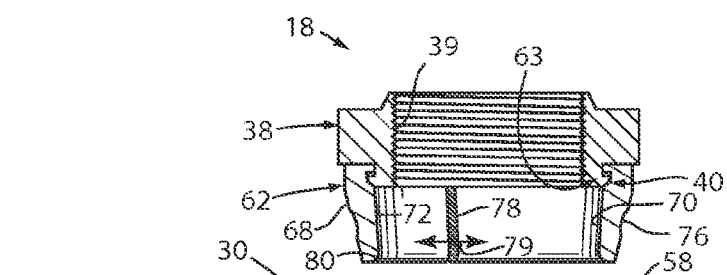
FIG. 4 is an exploded cross-sectional side view of the kingpin assembly.
Figure 4:
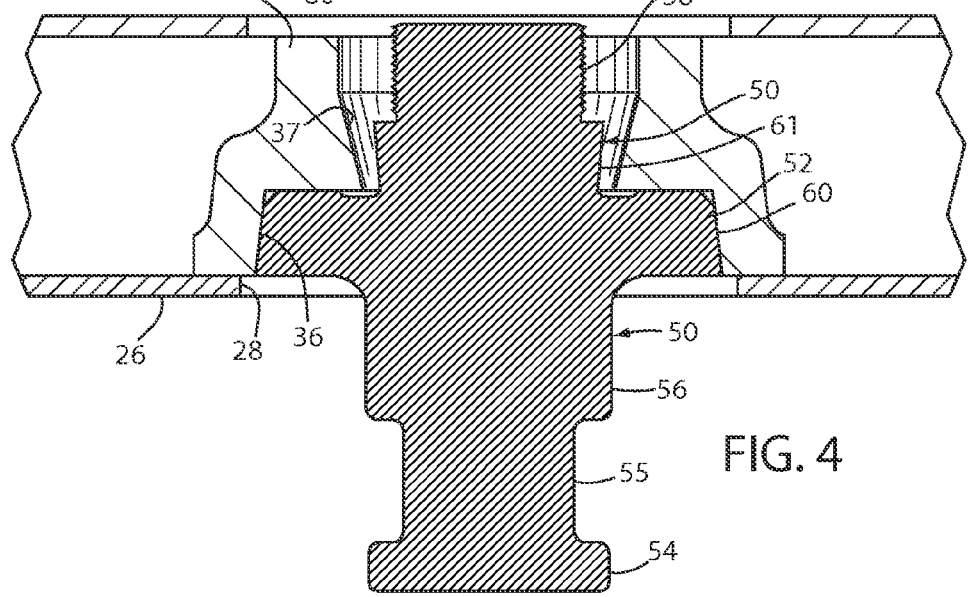
Figure 5:
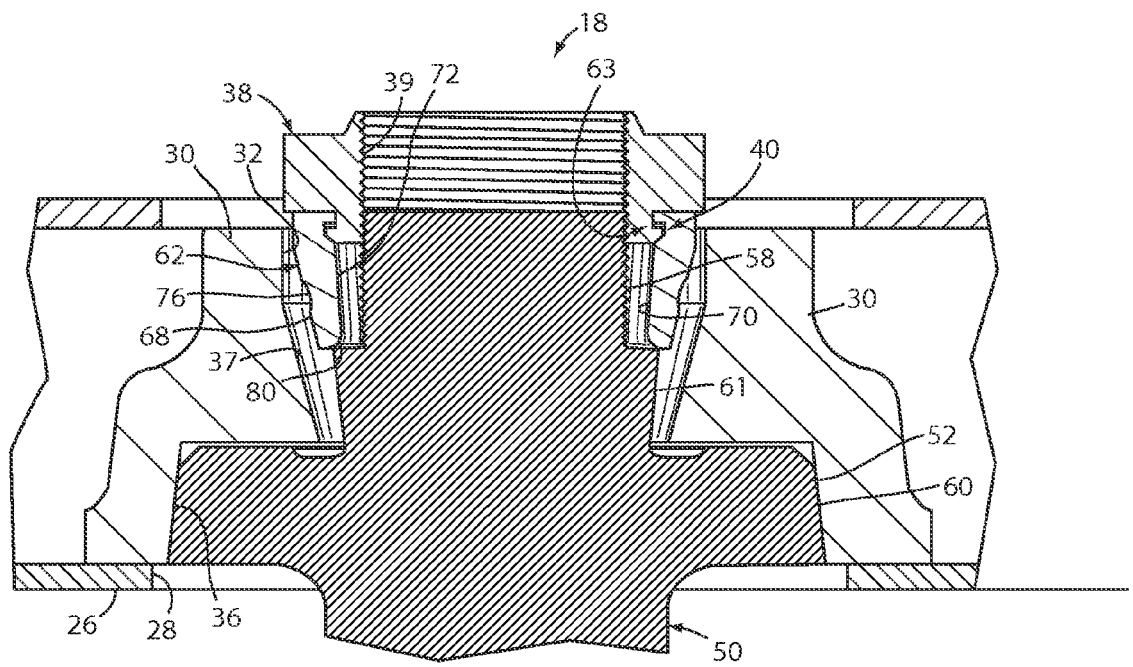
FIG. 5 is a cross-sectional side view of the kingpin assembly, wherein a coupler member is shown partially coupled with a kingpin, and a collet member is shown disengaged from the kingpin and a housing.
Figure 6:
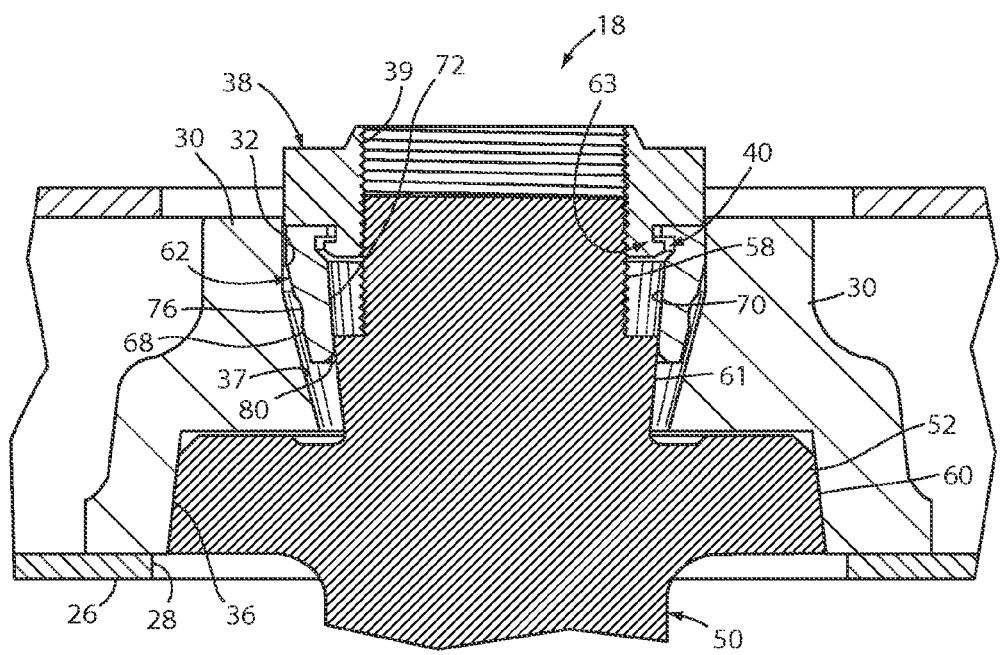
FIG. 6 is a cross-sectional side view of the kingpin assembly, wherein the coupler member is shown further coupled to the kingpin, and the collet member is shown partially engaging the kingpin.
Figure 7:
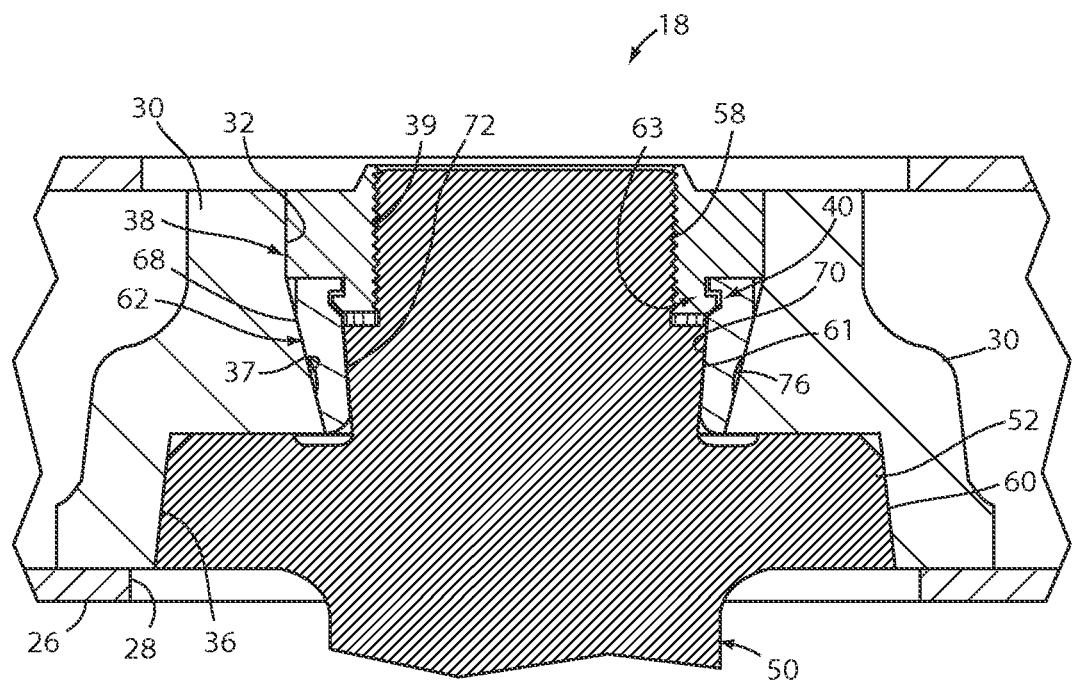
FIG. 7 is a cross-sectional side view of the kingpin assembly, wherein the coupler member is fully coupled to the kingpin, and the collet member is fully engaged with the kingpin and the housing; and, FIG. 8 is a cross-sectional side view of the kingpin assembly, wherein a keyway of the coupler member is shown abutting a keyway of the collet member.

The kingpin assembly 18 further includes a coupling member 62, which in the illustrated example comprises a collet member, positioned between the housing 30 and the kingpin 50. The collet member 62 is ring-shaped and includes a second portion of the coupler or a circumferentially extending keyway 63, a first abutment surface 64, a conically-shaped second abutment surface 65, a third abutment surface 66, a tapered, conically-shaped outer wall 68 and a conically-shaped inner wall 70 that defines an aperture 72 within which the kingpin 50 is received. In the illustrated example, the outer wall 68 includes a circumferentially-extending relief 76. As best illustrated in FIG. 4, a relief 78 extends through the collet member 62, thereby allowing the collet member 62 to expand and contract in a direction 79 as described below.

In assembly, as illustrated in FIGS. 4-7, the kingpin 50 is placed within the aperture 32 of the housing 30. The collet member 62 is then coupled with the collar member 38 such that the keyway 63 of the collet member 62 is coupled with the keyway 40 of the collar member 38. The collet member 62 and the collar member 38 are then positioned over the kingpin 50 and located between the housing 30 and the kingpin 50. The collar member 38 is then threadably coupled to the kingpin 50, so that the collar member 38 is tightened onto the kingpin 50, thereby forcing the first abutment surface 41 and the second abutment surface 42 of the collar member 38 into abutment with the first abutment surface 64 and the second abutment surface 65 of the collet member 62, respectively, thereby forcing the outer wall 68 of the collet member 62 into frictional engagement with the inner wall 37 of the aperture 32, and the inner wall 70 into frictional engagement with the abutment surface 61 of the kingpin 50 with the kingpin 50, and as a result increasing the frictional engagement between the housing 30, the collet member 62, and the kingpin 50, and preventing rotation of the kingpin 50 with respect to the housing 30. A rounded corner 80 (FIGS. 4 and 5) of the collet member 62 assists with beginning the engagement of the collet member 62 with the kingpin 50 as the inner diameter of the inner wall 70 may be less than the outer diameter of the kingpin 50 in the area of the abutment surface 61. The tightening of the collar member 38 with the kingpin 50 further draws the upper head portion 52 and the abutment surface 60 of the kingpin 50 into contact with the housing 30.

Figure 8:
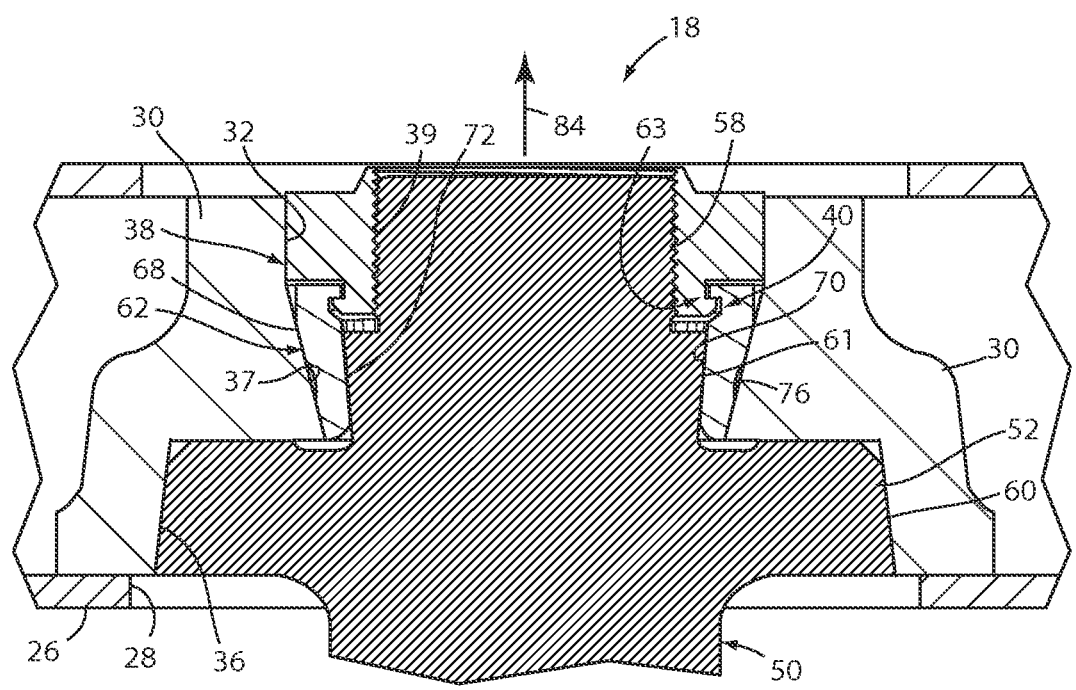

In disassembly, the collar member 38 (FIG. 8) is uncoupled from the kingpin 50 by unthreading the collar member 38 from the kingpin 50. As the collar member 38 is unthreaded the third abutment surface 43 of the collar member 38 abuts the third abutment surface 66 of the collet member 62, thereby moving the collet member 62 in an axial direction 84 and disengaging the collet member 62 from the inner wall 37 of the housing 30 and the abutment surface 61 of the kingpin 50. In the illustrated example, the collet member 62 is removed from the aperture 32 of the housing 30 along with the collar member 38.

The present inventive kingpin assembly prevents rotation of the kingpin with respect to the associated housing while simultaneously allowing easy access to and replacement of an associated kingpin subsequent to wear thereof. Further, the present inventive assembly is more durable, allows replacement of certain components thereof by even unskilled personnel, is extremely efficient in use, capable of a long operating life, and particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A kingpin assembly, comprising:
   a housing having a recess located therein;
   a kingpin having at least a portion located within the recess of the housing;
   a coupler member operably coupled to the kingpin; and
   a collet member engaging the housing and the kingpin, and engaging the coupler member such that at least partially uncoupling the coupler member from the kingpin at least partially disengages the collet member from the kingpin, wherein the collett member is movable between a seated position and an unseated position, wherein the coupler member is movable between a first position and a second position that is different from the first position, and wherein the coupler member moves the collett member from the seated position towards the unseated position as the coupler member is moved from the first position to the second position.

2. The kingpin assembly of claim 1, wherein the coupler member includes a first portion of a coupler and the collet member includes a second portion of the coupler, and wherein the first portion of the coupler is coupled with the second portion of the coupler.

3. The kingpin assembly of claim 1, wherein coupling the coupler member with the kingpin forces engagement of the collet member with at least one of the housing and the kingpin.

4. The kingpin assembly of claim 1, wherein coupling the coupler member with the kingpin forces engagement of the collet member with the housing and the kingpin.

5. The kingpin assembly of claim 1, wherein the coupler member is adjustable with respect to the kingpin such that adjusting the coupler with respect to the kingpin increases the frictional engagement between the collet member and at least one of the housing and the kingpin.

6. The kingpin assembly of claim 1, wherein the coupler member is threadably coupled with the kingpin.

7. The kingpin assembly of claim 1, wherein the coupler member includes an aperture through which the kingpin extends.

8. The kingpin assembly of claim 7, wherein the kingpin includes a threaded portion that is threadably received within the aperture of the coupler member.

9. The kingpin assembly of claim 8, wherein the recess of the housing includes a tapered inner wall, and wherein the collet member engages the tapered inner wall.

10. The kingpin assembly of claim 9, wherein the collet member includes a tapered outer wall that engages the tapered inner wall of the housing.

11. The kingpin assembly of claim 1, wherein the collet member is ring-shaped.

12. The kingpin assembly of claim 11, wherein the collet member includes a tapered inner wall that engages the tapered outer wall of the kingpin.

13. The kingpin assembly of claim 1, wherein the collet member is a single, integral piece.

14. A kingpin assembly, comprising:
    a housing having a recess located therein;
    a kingpin having at least a portion located within the recess of the housing;
    a coupler member operably coupled to the kingpin; and
    a collet member engaging the housing and the kingpin, and engaging the coupler member such that at least partially uncoupling the coupler member from the kingpin at least partially disengages the collect member from the kingpin, wherein the coupler member includes a first portion of a coupler and the collet member includes a second portion of the coupler, and wherein the first portion of the coupler is coupled with the second portion of the coupler, and wherein the first portion of the coupler comprises a first keyway and the second portion of the coupler includes a second keyway.

15. The kingpin assembly of claim 14, wherein the first keyway and second keyway are each circumferentially extending.

16. A kingpin assembly, comprising:
    a housing having a recess located therein;

a kingpin having at least a portion located within the recess of the housing;

a coupler member operably coupled to the kingpin; and a collet member engaging the housing and the kingpin, and engaging the coupler member such that at least partially uncoupling the coupler member from the kingpin at least partially disengages the collet member from the kingpin, wherein the coupler member includes a first portion of a coupler and the collet member includes a second portion of the coupler, and wherein the first portion of the coupler is coupled with the second portion of the coupler, and wherein the first portion of the coupler engages the second portion of the coupler as the coupler member is at least partially uncoupled from the kingpin, thereby at least partially disengaging the collet member from the kingpin.

17. The kingpin assembly of claim 16, wherein the first portion of the coupler engages the second portion of the coupler as the coupler member is threadably uncoupled from the kingpin.

18. A kinpin assembly, comprising:

a housing having a recess located therein;

a kingpin having at least a portion located within the recess of the housing;

a coupler member operably coupled to the kingpin; and a collet member engaging the housing and the kingpin, and engaging the coupler member such that at least partially uncoupling the coupler member from the kingpin at least partially disengages the collet member from the kingpin, wherein the collet member is positioned between the kingpin and the coupler member.

19. A kingpin assembly, comprising:

a housing having a recess located therein;

a kingpin having at least a portion located within the recess of the housing;

a coupler member operably coupled to the kingpin; and a collet member engaging the housing and the kingpin, and engaging the coupler member such that at least partially uncoupling the coupler member from the kingpin at least partially disengages the collet member from the kingpin, wherein the kingpin includes a tapered outer wall, and wherein the collett member engages the tapered outer wall of the kingpin.

20. A kingpin assembly, comprising:

a housing having a recess located therein;

a kingpin having at least a portion located within the recess of the housing;

a coupler member operably coupled to the kingpin; and a collet member engaging the housing and the kingpin, and engaging the coupler member such that at least partially uncoupling the coupler member from the kingpin at least partially disengages the collet member from the kingpin, wherein the collett member is ring shaped, and wherein the collett member includes a slot positioned about the periphery thereof.

21. The kingpin assembly of claim 20, wherein the kingpin is a single, integral piece.

22. A kingpin assembly, comprising:

a housing having a recess located therein;

a kingpin having at least a portion located within the recess of the housing;

a coupler member operably coupled to the kingpin; and a collet member engaging the housing and the kingpin, and engaging the coupler member such that at least partially uncoupling the coupler member from the kingpin at least partially disengages the collet member from the kingpin, wherein the housing and the kingpin each include conically-shaped surfaces that about one another.

23. A kingpin assembly, comprising:

a housing having a recess located therein;

a kingpin having at least a portion located within the recess of the housing;

a coupler member operably coupled to the kingpin; and a collet member engaging the housing and the kingpin, and engaging the coupler member such that at least partially uncoupling the coupler member from the kingpin at least partially disengages the collet member from the kingpin, wherein the coupler member comprises am spanner nut threadably coupled with the kingpin.

* * * * *